US012609543B2

(12) United States Patent
Wu et al.

(10) Patent No.: US 12,609,543 B2
(45) Date of Patent: Apr. 21, 2026

(54) BATTERY MANAGEMENT SYSTEM AND OVER-VOLTAGE PROTECTION METHOD THEREOF

(71) Applicant: Cheng Uei Precision Industry Co., Ltd., New Taipei City (TW)

(72) Inventors: Ti Wu, New Taipei City (TW); Chin Huang Tseng, New Taipei City (TW)

(73) Assignee: Cheng Uei Precision Industry Co., Ltd., New Taipei City (TW)

( * ) Notice: Subject to any disclaimer, the term of this patent is extended or adjusted under 35 U.S.C. 154(b) by 624 days.

(21) Appl. No.: 18/138,757

(22) Filed: Apr. 25, 2023

(65) Prior Publication Data

US 2023/0396083 A1      Dec. 7, 2023

(30) Foreign Application Priority Data

Jun. 7, 2022     (CN) .......................... 202210632972.7

(51) Int. Cl.
| | |
|---|---|
| *H02J 7/64* | (2026.01) |
| *B60L 53/18* | (2019.01) |
| *B60L 58/13* | (2019.01) |
| *B60L 58/15* | (2019.01) |
| *H02J 7/96* | (2026.01) |

(52) U.S. Cl.
CPC .............. *H02J 7/64* (2026.01); *B60L 53/18* (2019.02); *B60L 58/13* (2019.02); *B60L 58/15* (2019.02); *H02J 7/96* (2026.01)

(58) Field of Classification Search
CPC ........ H02J 7/64; H02J 7/96; H02J 7/61; H02J 7/663; H02J 7/62; H02J 7/63; B60L 53/18; B60L 58/13; B60L 58/15; B60L 3/04; B60L 2240/545; B60L 2240/547; B60L 2240/549

USPC ......................................................... 320/134
See application file for complete search history.

(56) References Cited

U.S. PATENT DOCUMENTS

| | | | | |
|---|---|---|---|---|
| 6,653,820 | B1 * | 11/2003 | Smith .................... | H01M 10/44 |
| | | | | 320/136 |
| 7,561,394 | B2 * | 7/2009 | Mulligan ............... | H02H 7/067 |
| | | | | 361/111 |
| 7,924,540 | B2 * | 4/2011 | Tamegai ................... | H02J 7/64 |
| | | | | 361/91.1 |

(Continued)

OTHER PUBLICATIONS

Critical Review of Intelligent Battery Systems: Challenges, Implementation, and Potential for Electric Vehicles. Published in: Energies (19961073),Sep. 2021 By: Lidiya Komsiyska et al., Source: Energies (19961073). Sep. 2021, vol. 14 Issue 18, p. 5989-5989. (Year: 2021).*

*Primary Examiner* — M Baye Diao

(57)      ABSTRACT

A battery management system includes a battery cell module, a switching circuit, an analog front-end circuit, an electrically erasable read-only memory which is reproducible, and a micro-controller. The switching circuit is connected in parallel with the battery cell module. The switching circuit includes a charging field-effect transistor and a discharging field-effect transistor. The analog front-end circuit is configured to monitor battery information of the battery cell module. The battery information includes a voltage of the battery cell module, a current of the battery cell module and a temperature of the battery cell module. The analog front-end circuit is connected with the switching circuit. The micro-controller stores a starting program.

5 Claims, 4 Drawing Sheets

100

(56)          References Cited

U.S. PATENT DOCUMENTS

| | | | | |
|---|---|---|---|---|
| 8,416,549 | B2 * | 4/2013 | Migliavacca ........... | H02J 7/663 |
| | | | | 361/91.1 |
| 9,496,749 | B2 * | 11/2016 | Noda ...................... | B60L 58/15 |
| 9,740,261 | B2 * | 8/2017 | Waters .................... | G06F 1/266 |
| 9,876,360 | B2 * | 1/2018 | Kravitz .................. | H02J 3/381 |
| 10,116,149 | B1 * | 10/2018 | Dao .................... | H01M 10/425 |
| 10,431,939 | B2 * | 10/2019 | Oporta ...................... | G05F 3/02 |
| 10,734,687 | B2 * | 8/2020 | Baek ........................ | B62M 6/90 |
| 11,437,830 | B2 * | 9/2022 | Hoyt ...................... | H02J 7/663 |
| 11,865,944 | B2 * | 1/2024 | Brumley, Jr. .......... | B60L 58/15 |
| 2008/0012531 | A1 * | 1/2008 | Chang ...................... | H02J 7/54 |
| | | | | 320/136 |
| 2008/0012532 | A1 * | 1/2008 | Denning .............. | H01M 10/42 |
| | | | | 361/111 |
| 2011/0172940 | A1 * | 7/2011 | Wood ................. | G01R 31/3835 |
| | | | | 702/63 |

* cited by examiner

BATTERY MANAGEMENT SYSTEM AND OVER-VOLTAGE PROTECTION METHOD THEREOF

CROSS-REFERENCE TO RELATED APPLICATION

The present application is based on, and claims priority from, China Patent Application No. 202210632972.7, filed Jun. 7, 2022, the disclosure of which is hereby incorporated by reference herein in its entirety.

BACKGROUND OF THE INVENTION

1. Field of the Invention

The present invention generally relates to a battery management system, and more particularly to a battery management system which is able to be switched to a discharge mode when a voltage of a battery cell module exceeds a voltage protection threshold from a beginning, and an over-voltage protection method of the battery management system.

2. The Related Art

High voltage lithium batteries are widely used as main energy storage media in electric vehicles and large-scale energy storage systems. For a space consideration reason or a wiring convenience reason, the high voltage lithium batteries are mostly formed by battery cell modules. In order to avoid abnormal conditions, such as an overcharging condition, an over discharging condition, an overheating condition and other conditions from happening, the high voltage lithium batteries are further equipped with a battery management system (BMS) for detecting and controlling each battery cell module.

Referring to FIG. 4, a conventional battery management system 100' includes a switching circuit 20' which is connected in parallel with a battery cell module 10', and a logic circuit 30'. The logic circuit 30' is provided to monitor battery information of the battery cell module 10', such as a voltage of the battery cell module 10', a current of the battery cell module 10' and a temperature of the battery cell module 10', etc. The logic circuit 30' is connected to the switching circuit 20'. When the logic circuit 30' detects that the voltage of the battery cell module 10' is too high or too low, the logic circuit 30' sends a stop signal to the switching circuit 20' to stop charging or discharging the battery cell module 10'.

However, if the voltage of the battery cell module 10' initially exceeds a voltage protection threshold from a beginning, the switching circuit 20' is immediately cut off at the time of starting the conventional battery management system 100', the battery cell module 10' is unable to be charged and discharged normally until the voltage of the battery cell module 10' is naturally rebounded to a range of the voltage protection threshold. As a result, the conventional battery management system 100' is used inconveniently.

Therefore, it is necessary to provide an innovative battery management system and an over-voltage protection method of the battery management system, the battery management system is able to be directly switched to a discharge mode when a voltage of a battery cell module exceeds a voltage protection threshold from a beginning.

SUMMARY OF THE INVENTION

An object of the present invention is to provide a battery management system which is able to be switched to a discharge mode when a voltage of a battery cell module exceeds a voltage protection threshold from a beginning, and an over-voltage protection method of the battery management system. The battery management system includes a battery cell module, a switching circuit, an analog front-end circuit, an electrically erasable read-only memory which is reproducible, and a micro-controller. The switching circuit is connected in parallel with the battery cell module. The switching circuit includes a charging field-effect transistor and a discharging field-effect transistor. The analog front-end circuit is configured to monitor battery information of the battery cell module. The battery information includes the voltage of the battery cell module, a current of the battery cell module and a temperature of the battery cell module. The analog front-end circuit is connected with the switching circuit. The micro-controller stores a starting program. When the starting program is executed by the micro-controller, the starting program checks whether a charging cable is connected to the battery management system via the analog front-end circuit, if the charging cable is connected to the battery management system, continue to execute an over-voltage protection program, if the charging cable is unconnected with the battery management system, the battery information and instructions are unwritten to the analog front-end circuit to just make the analog front-end circuit continue measuring the battery information. When the over-voltage protection program is executed by the micro-controller, the micro-controller sends over-voltage protection parameters and over-voltage protection instructions to the analog front-end circuit, check the voltage of the battery cell module by the analog front-end circuit, and check whether the charging cable is connected to the battery management system via the analog front-end circuit, when the voltage of the battery cell module is higher than a voltage protection threshold, and the charging cable is connected to the battery management system, the analog front-end circuit sends a stop signal to the charging field-effect transistor and the discharging filed-effect transistor to stop charging the battery cell module, the micro-controller writes an over-voltage protection status to a log of the electrically erasable read-only memory, the battery management system keeps displaying an over-voltage protection lamp signal, when the voltage of the battery cell module is higher than the voltage protection threshold, and the charging cable is unconnected with the battery management system, the micro-controller writes the over-voltage protection status to the log of the electrically erasable read-only memory, and the micro-controller directly shuts down the battery management system to stop all charging and discharging processes of the battery cell module, when the voltage of the battery cell module is lower than the voltage protection threshold, the battery management system keeps the battery cell module in a chargeable and dischargeable state.

Another object of the present invention is to provide an over-voltage protection method of a battery management system for avoiding a battery cell module from overcharging. The battery management system includes an electrically erasable read-only memory, a charging field-effect transistor electrically connected to the battery cell module for controlling a charging current, an analog front-end circuit electrically connected to the battery cell module and the charging field-effect transistor for monitoring battery information and controlling the charging field-effect transistor, and a micro-controller electrically connected to the analog front-end circuit. The micro-controller stores over-voltage protection parameters and over-voltage protection instructions. Specific steps of the over-voltage protection method are described hereinafter. Start the battery management system. Execute a starting program by the micro-controller to check whether a charging cable is connected to the battery management system via the analog front-end circuit, if the charging cable is connected to the battery management system, execute a step of executing an over-voltage protection program by the micro-controller, if the charging cable is unconnected with the battery management system, execute a step of unwriting the over-voltage protection parameters and the over-voltage protection instructions to the analog front-end circuit via the micro-controller. Unwrite the over-voltage protection parameters and the over-voltage protection instructions to the analog front-end circuit via the micro-controller. Keep the analog front-end circuit measuring the battery information by the micro-controller. When the voltage of the battery cell module exceeds the voltage protection threshold from a beginning, the battery management system is prevented from cutting off the charging field-effect transistor, and the battery cell module is still able to discharge normally. Execute the over-voltage protection program by the micro-controller. Send the over-voltage protection parameters and the over-voltage protection instructions to the analog front-end circuit by the micro-controller. Check whether the voltage of the battery cell module is higher than the voltage protection threshold by the analog front-end circuit. Check whether the charging cable is connected to the battery management system by the analog front-end circuit. When the voltage of the battery cell module is higher than the voltage protection threshold, and the charging cable is connected to the battery management system to charge the battery cell module, proceed with a step of sending a stop signal to the charging field-effect transistor by the analog front-end circuit, so the battery cell module is stopped being charged to prevent an over-charging of the battery cell module from damaging the battery cell module, the micro-controller writes an over-voltage protection status to a log of the electrically erasable read-only memory, and the battery management system keeps displaying an over-voltage protection lamp signal. When the voltage of the battery cell module is higher than the voltage protection threshold, and the charging cable is unconnected with the battery management system, execute steps of writing the over-voltage protection status to the log of the electrically erasable read-only memory by the micro-controller and shutting down the battery management system directly to stop further charging or discharging the battery cell module. when the voltage of the battery cell module is lower than the voltage protection threshold, execute a step of keeping the battery cell module being in a chargeable and dischargeable state and being without checking a connection of the charging cable, the battery cell module is located in a safe status.

Another object of the present invention is to provide an over-voltage protection method of a battery management system for avoiding a battery cell module from overcharging. The battery management system includes a charging field-effect transistor electrically connected to the battery cell module for controlling a charging current, a discharging field-effect transistor, an analog front-end circuit electrically connected to the battery cell module and the charging field-effect transistor for monitoring battery information and controlling the charging field-effect transistor, and a micro-controller electrically connected to the analog front-end circuit. The micro-controller stores over-voltage protection parameters and over-voltage protection instructions. Specific steps of the over-voltage protection method are described hereinafter. Check whether a charging cable is connected to the battery management system via the analog front-end circuit, if the charging cable is connected to the battery management system, execute a step of executing an over-voltage protection program, if the charging cable is unconnected with the battery management system, execute a step of unwriting the over-voltage protection parameters and the over-voltage protection instructions to the analog front-end circuit. Unwrite the over-voltage protection parameters and the over-voltage protection instructions to the analog front-end circuit via the micro-controller. Keep the analog front-end circuit measuring the battery information by the micro-controller. When the voltage of the battery cell module exceeds a voltage protection threshold from a beginning, the battery management system is prevented from cutting off the charging field-effect transistor, and the battery cell module is still able to discharge normally. Execute the over-voltage protection program by the micro-controller. Sending the over-voltage protection parameters and the over-voltage protection instructions to the analog front-end circuit by the micro-controller. The analog front-end circuit checks whether the voltage of the battery cell module is higher than the voltage protection threshold. Check whether the charging cable is connected to the battery management system by the analog front-end circuit. When the voltage of the battery cell module is higher than the voltage protection threshold, and the charging cable is connected to the battery management system, proceed with a step of sending the stop signal to the charging field-effect transistor, when the voltage of the battery cell module is higher than the voltage protection threshold, and the charging cable is unconnected with the battery management system, execute a step of shutting down the battery management system, when the voltage of the battery cell module is lower than the voltage protection threshold, execute a step of keeping the battery cell module being in a chargeable and dischargeable state. Procedures of executing the over-voltage protection program include charging and discharging the battery cell module when an electric vehicle using the battery management system is in a driving status, checking whether the voltage of the battery cell module is higher than the voltage protection threshold by the analog front-end circuit, checking whether a recharging current exists by the analog front-end circuit, when the voltage of the battery cell module is higher than the voltage protection threshold and the recharging current exists, proceeding with a next step of stopping charging the battery cell module, when the voltage of the battery cell module is higher than the voltage protection threshold and the recharging current is nonexistent, then proceeding with a subsequent step of keeping the battery cell module in the chargeable and dischargeable state, and when the voltage of the battery cell module is lower than the voltage protection threshold, then proceeding with the subsequent step of keeping the battery cell module in the chargeable and dischargeable state, sending a shut command to the analog front-end circuit when the voltage of the battery cell module is higher than the voltage protection threshold and the recharging current exists, the analog front-end circuit sending the stop signal to the charging field-effect transistor and the discharging field-effect transistor to stop charging the battery cell module, then the analog front-end circuit checking whether the recharging current exists until the recharging current is nonexistent, and keeping the battery cell module being in the chargeable and dischargeable state when the voltage of the battery cell module is lower than the voltage protection threshold, or the voltage of the battery cell module is higher than the voltage protection threshold and the recharging current is nonexistent, the battery cell module being located in a safe status, and then returning to the recharging protection step of charging and discharging the battery cell module when the electric vehicle is in the driving status. Send a stop signal to the charging field-effect transistor by the analog front-end circuit to stop charging the battery cell module when the voltage of the battery cell module is higher than the voltage protection threshold and the charging cable is connected to the battery management system, then an over-voltage protection loop is generated, the analog front-end circuit checks whether the charging cable is connected to the battery management system until the charging cable is unconnected. Write an over-voltage protection status to a log of an electrically erasable read-only memory by the micro-controller when the battery cell module is charged to make the voltage of the battery cell module be higher than the voltage protection threshold and the charging cable is moved away, the micro-controller shuts down the battery management system directly to stop further charging or discharging the battery cell module. Keep the battery cell module being in the chargeable and dischargeable state without checking a connection of the charging cable when the voltage of the battery cell module is lower than the voltage protection threshold, the battery cell module is located in a safe status.

As described above, the battery management system checks whether the charging cable is connected, if the charging cable is without being connected to the battery management system, unwrite the over-voltage protection parameters or the over-voltage protection instructions to the analog front-end circuit, the analog front-end circuit continues measuring the battery information, so when the voltage of the battery cell module exceeds the voltage protection threshold from the beginning, and the battery cell module is still able to discharge normally and directly.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
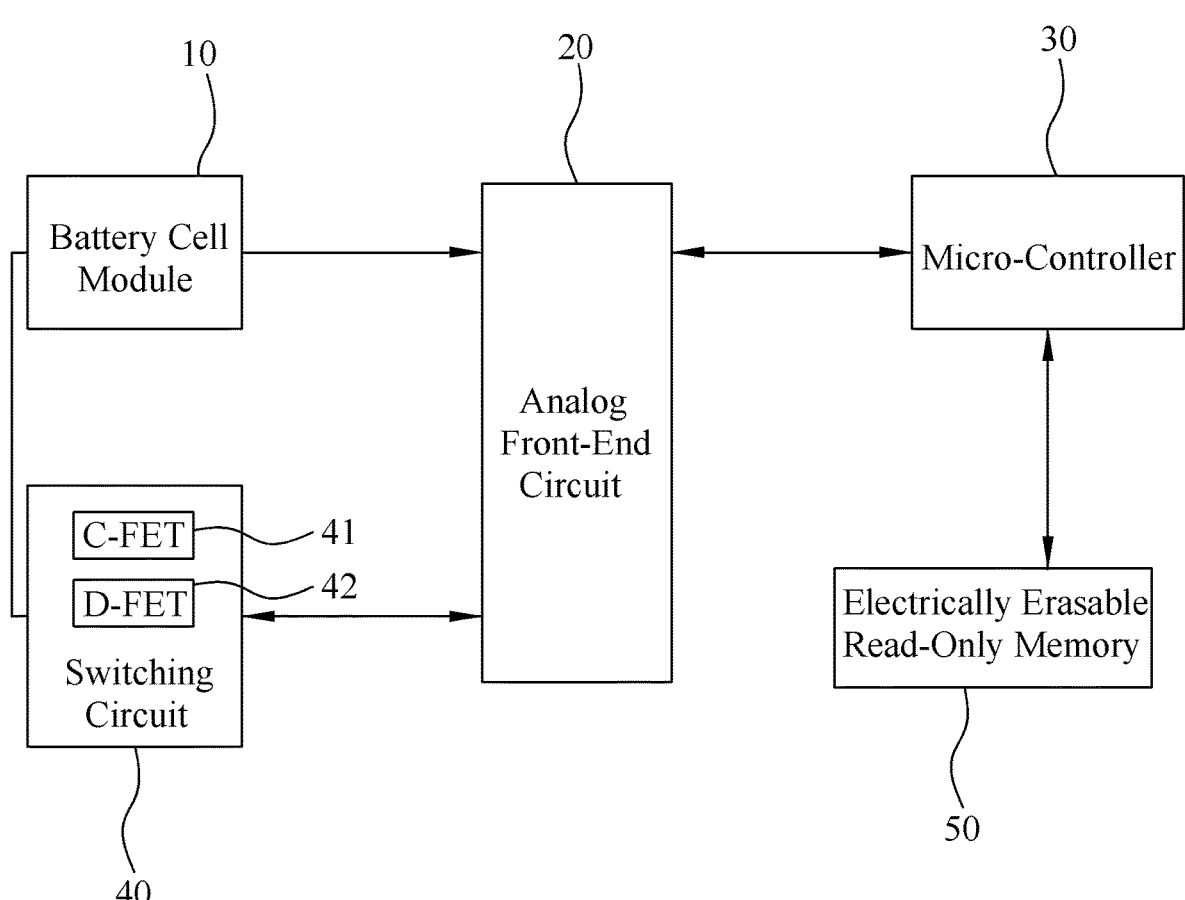
FIG. 1 is a block diagram of a battery management system in accordance with the present invention.

Referring to FIG. 1, a battery management system 100 in accordance with the present invention is shown. The battery management system 100 applies an over-voltage protection method to proceed with an over-voltage protection. A block diagram of the battery management system 100 in accordance with the present invention is shown.

The battery management system 100 includes a battery cell module 10, an analog front-end circuit 20, a micro-controller 30, a switching circuit 40 and an electrically erasable read-only memory (EEROM) 50. The electrically erasable read-only memory 50 is reproducible. The switching circuit 40 is connected in parallel with the battery cell module 10. The switching circuit 40 includes a charging field-effect transistor (C-FET) 41 and a discharging field-effect transistor (D-FET) 42. The analog front-end circuit 20 is connected with the switching circuit 40. The analog front-end circuit 20 is configured to monitor battery information of the battery cell module 10. The battery information includes a voltage of the battery cell module 10, a current of the battery cell module 10 and a temperature of the battery cell module 10. The charging field-effect transistor (C-FET) 41 is electrically connected to the battery cell module 10 for controlling a charging current. The analog front-end circuit 20 is electrically connected to the battery cell module 10 and the charging field-effect transistor (C-FET) 41 for monitoring the battery information and controlling the charging field-effect transistor (C-FET) 41, and the micro-controller 30 is electrically connected to the analog front-end circuit 20, and the micro-controller 30 stores over-voltage protection parameters and over-voltage protection instructions.

The micro-controller 30 stores a starting program. When the starting program is executed by the micro-controller 30, the starting program checks whether a charging cable is connected to the battery management system 100 via the analog front-end circuit 20. If the charging cable is connected to the battery management system 100, continue to execute an over-voltage protection program. If the charging cable is unconnected with the battery management system 100, the battery information and the instructions are unwritten to the analog front-end circuit 20 to just make the analog front-end circuit 20 continue measuring the battery information.

When the over-voltage protection program is executed by the micro-controller 30, the micro-controller 30 sends the over-voltage protection parameters and the over-voltage protection instructions to the analog front-end circuit 20. Check the voltage of the battery cell module 10 by the analog front-end circuit 20, and check whether the charging cable is connected to the battery management system 100 via the analog front-end circuit 20. When the voltage of the battery cell module 10 is higher than a set voltage protection threshold, and the charging cable is connected to the battery management system 100, the analog front-end circuit 20 sends a stop signal to the charging field-effect transistor (C-FET) 41 and the discharging field-effect transistor (D-FET) 42 to stop charging the battery cell module 10. The micro-controller 30 writes an over-voltage protection status to a log of the electrically erasable read-only memory 50, and the battery management system 100 keeps displaying an over-voltage protection lamp signal. When the voltage of the battery cell module 10 is higher than the voltage protection threshold, and the charging cable is unconnected with the battery management system 100, the micro-controller 30 writes the over-voltage protection status to the log of the electrically erasable read-only memory 50, and the micro-controller 30 directly shuts down the battery management system 100 to stop all charging and discharging processes of the battery cell module 10. When the voltage of the battery cell module 10 is lower than the voltage protection threshold, the battery management system 100 keeps the battery cell module 10 in a chargeable and dischargeable state.

Figure 2:
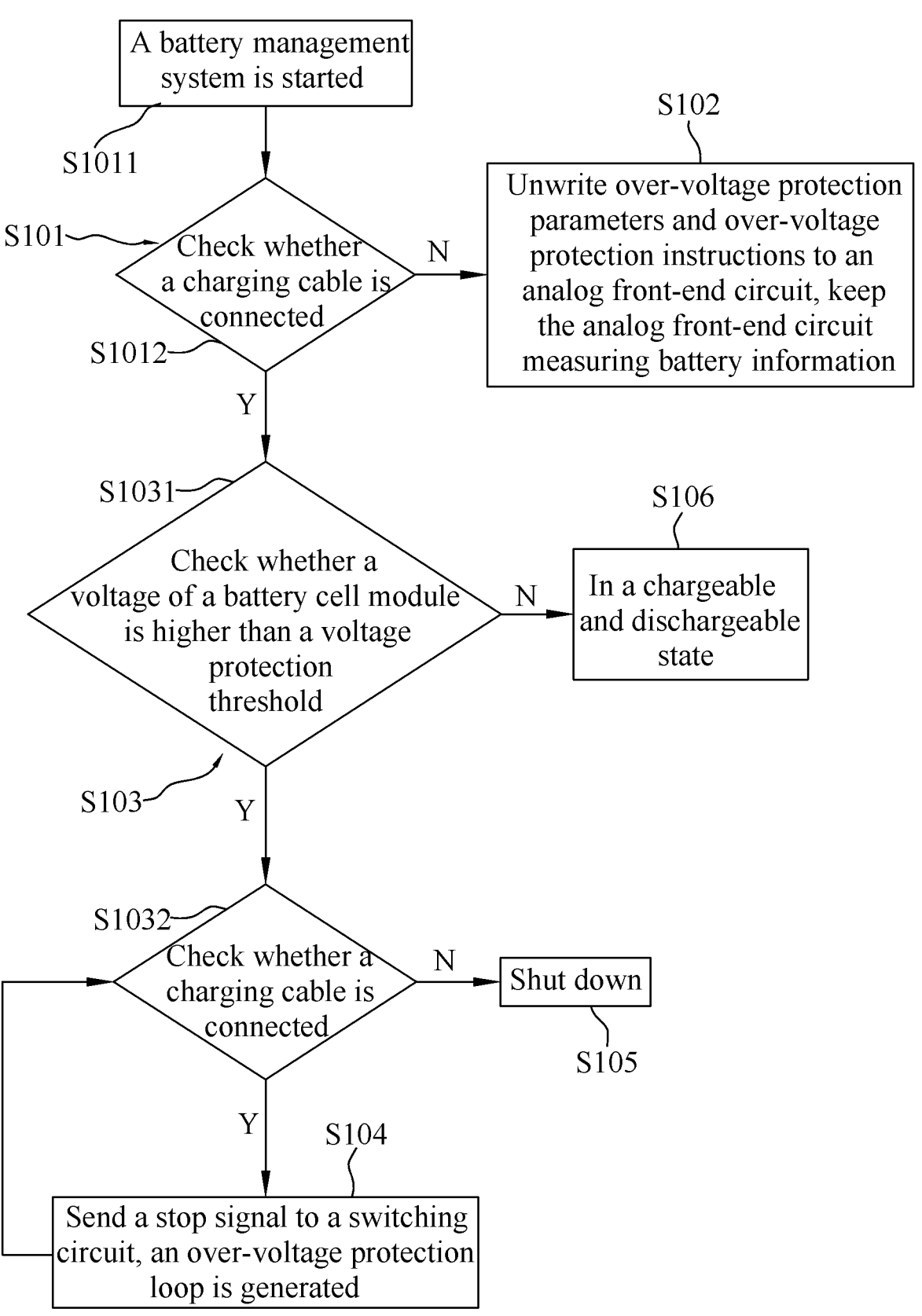
FIG. 2 is a flow chart of an over-voltage protection method of the battery management system in accordance with the present invention.

Referring to FIG. 1 and FIG. 2, an over-voltage protection of the battery management system 100 is operated by use of the over-voltage protection method for avoiding the battery cell module 10 from overcharging, a flow chart of the over-voltage protection method is shown in FIG. 2. Specific steps of the over-voltage protection method of the battery management system 100 are described as follows. The steps of the over-voltage protection method of the battery management system 100 include a step S101, a step S102, a step S103, a step S104, a step S105 and a step S106. The step S101 includes a step S1011 and a step S1012. The step S103 includes a step S1031 and a step S1032.

Step S1011: start the battery management system 100.

Step S1012: when the battery management system 100 is started, check whether the charging cable is connected to the battery management system 100 via the analog front-end circuit 20. Specifically, execute the starting program by the micro-controller 30 to check whether the charging cable is connected to the battery management system 100 via the analog front-end circuit 20, if the charging cable is connected to the battery management system 100, execute the step S103 of executing the over-voltage protection program by the micro-controller 30, if the charging cable is unconnected with the battery management system 100, execute the step S102 of unwriting the over-voltage protection parameters and the over-voltage protection instructions to the analog front-end circuit 20 via the micro-controller 30.

Step S102: unwrite the over-voltage protection parameters and the over-voltage protection instructions to the analog front-end circuit 20 via the micro-controller 30, keep the analog front-end circuit 20 measuring the battery information by the micro-controller 30, so when the voltage of the battery cell module 10 exceeds the voltage protection threshold from a beginning, the battery management system 100 is prevented from cutting off the charging field-effect transistor (C-FET) 41 of the switching circuit 40 immediately, and the battery cell module 10 is still able to discharge normally.

Step S1031: execute the over-voltage protection program by the micro-controller 30, send the over-voltage protection parameters and the over-voltage protection instructions to the analog front-end circuit 20 by the micro-controller 30, check whether the voltage of the battery cell module 10 is higher than the voltage protection threshold by the analog front-end circuit 20.

Step S1032: check whether the charging cable is connected to the battery management system 100 by the analog front-end circuit 20, when the voltage of the battery cell module 10 is higher than the voltage protection threshold, and the charging cable is connected to the battery management system 100 to charge the battery cell module 10, proceed with the step S104 of sending the stop signal to the charging field-effect transistor (C-FET) 41 of the switching circuit 40 by the analog front-end circuit 20, so the battery cell module 10 is stopped being charged to prevent an over-charging of the battery cell module 10 from damaging the battery cell module 10, the micro-controller 30 writes the over-voltage protection status to the log of the electrically erasable read-only memory 50, and the battery management system 100 keeps displaying the over-voltage protection lamp signal. when the voltage of the battery cell module 10 is higher than the voltage protection threshold, and the charging cable is unconnected with the battery management system 100, execute the step S105 of writing the over-voltage protection status to the log of the electrically erasable read-only memory 50 by the micro-controller 30 and shutting down the battery management system 100 directly to stop further charging or discharging the battery cell module 10, and when the voltage of the battery cell module 10 is lower than the voltage protection threshold, execute the step S106 of keeping the battery cell module 10 being in the chargeable and dischargeable state and being without checking a connection of the charging cable, the battery cell module 10 is located in a safe status.

Step S104: send the stop signal to the charging field-effect transistor (C-FET) 41 of the switching circuit 40 by the analog front-end circuit 20 to stop charging the battery cell module 10 when the voltage of the battery cell module 10 is higher than the set voltage protection threshold and the charging cable is connected to the battery management system 100 for charging the battery cell module 10, the micro-controller 30 writes the over-voltage protection status to the log of the electrically erasable read-only memory 50, and the battery management system 100 keeps displaying the over-voltage protection lamp signal, then an over-voltage protection loop is generated, the analog front-end circuit 20 checks whether the charging cable is connected to the battery management system 100 until the charging cable is unconnected, so the battery cell module 10 is prevented from being damaged due to the over-charging of the battery cell module 10.

Step S105: write the over-voltage protection status to the log of the electrically erasable read-only memory 50 by the micro-controller 30 when the battery cell module 10 is charged to make the voltage of the battery cell module 10 be higher than the voltage protection threshold and the charging cable is moved away, and the micro-controller 30 shuts down the battery management system 100 directly to stop further charging or discharging the battery cell module 10 for preventing the battery cell module 10 being damaged due to the overcharging.

Step S106: the battery management system 100 keeps the battery cell module 10 being in the chargeable and dischargeable state and being without checking the connection of the charging cable when the voltage of the battery cell module 10 is lower than the voltage protection threshold, the battery cell module 10 is located in the safe status.

Figure 3:
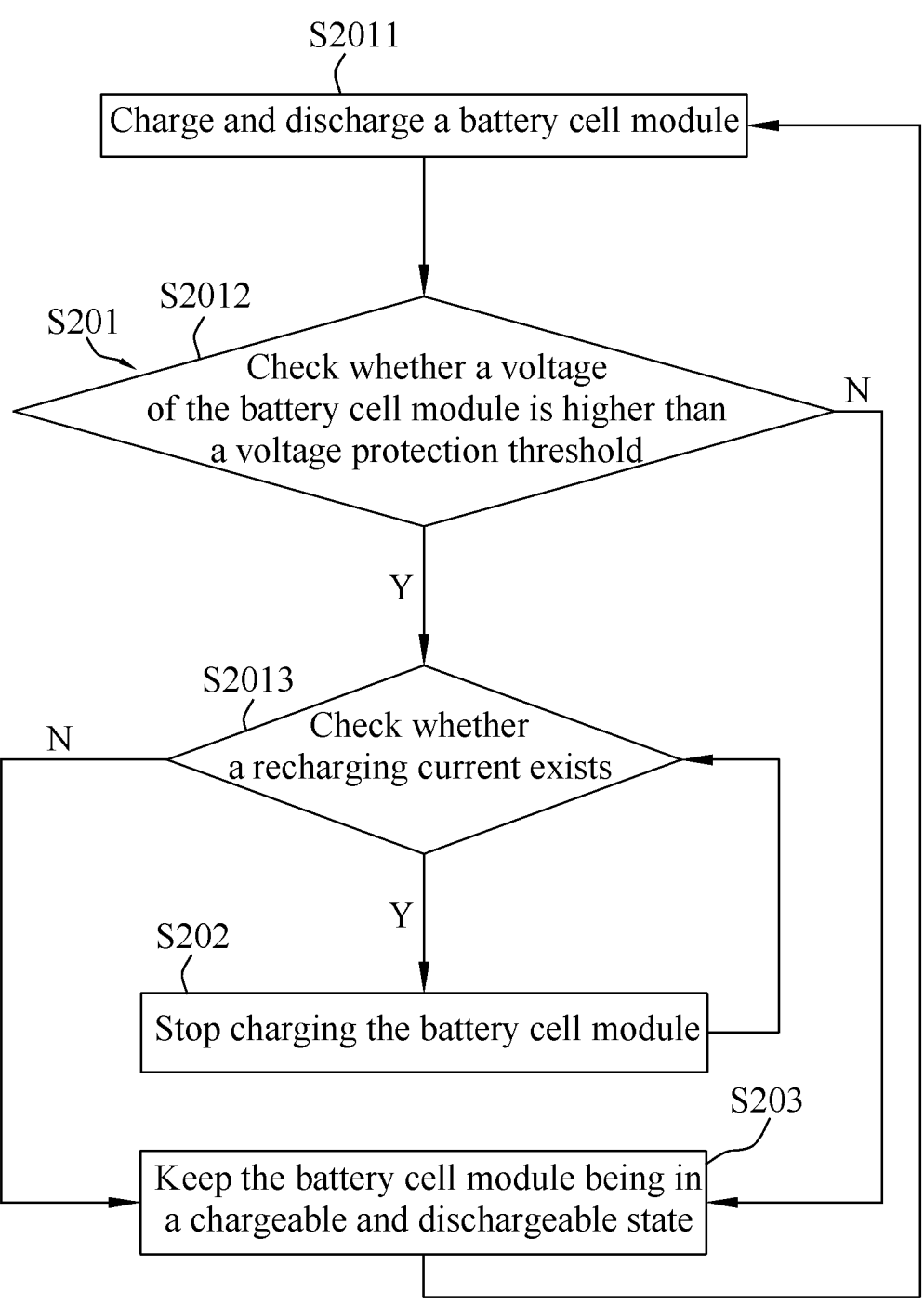
FIG. 3 is a flow chart of a recharging protection program of the battery management system in accordance with the present invention.
Figure 4:
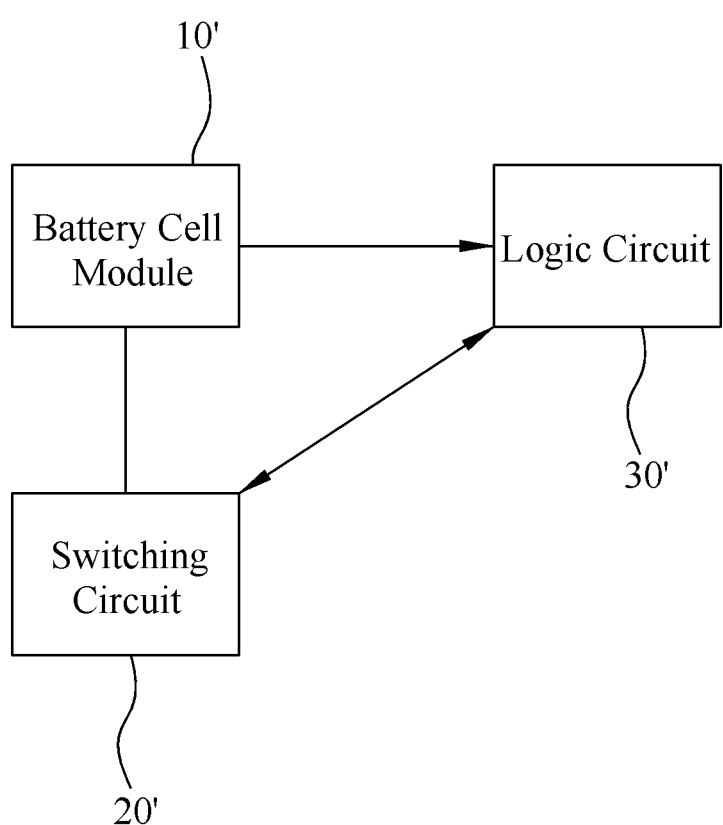
FIG. 4 is a block diagram of a conventional battery management system in prior art.

Referring to FIG. 1 to FIG. 3, the battery management system 100 is applied to an electric vehicle, when the electric vehicle which is equipped with an electric energy recovery system brakes or decelerates, a kinetic energy of the electric vehicle is converted into an electric energy, and the electric energy is recharged to the battery cell module 10. In this case, in order to avoid the battery cell module 10 being overcharged during a recharging process, the micro-controller 30 further stores a recharging protection program. When the recharging protection program is executed by the micro-controller 30, the micro-controller 30 checks the voltage of the battery cell module 10 via the analog front-end circuit 20, and the micro-controller 30 writes the over-voltage protection parameters and the over-voltage protection instructions to the analog front-end circuit 20. When the voltage of the battery cell module 10 is higher than the voltage protection threshold and the battery cell module 10 has a recharging current, the micro-controller 30 sends a shut command to the analog front-end circuit 20, the analog front-end circuit 20 sends the stop signal to the charging field-effect transistor (C-FET) 41 and the discharging field-effect transistor (D-FET) 42 to stop charging the battery cell module 10, the micro-controller 30 receives a recharging over-voltage protection status from the analog front-end circuit 20, the micro-controller 30 writes the recharging over-voltage protection status to the log of the electrically erasable read-only memory 50.

After the recharging protection program is executed, in the step S103 of executing the over-voltage protection program, the over-voltage protection method further includes following steps. Procedures of executing recharging protection program include a step S201, a step S202 and a step S203. The step S201 includes a step S2011, a step S2012 and a step S2013.

Step S2011: charge and discharge the battery cell module 10 when the electric vehicle using the battery management system 100 is in a driving status, the battery cell module 10 is in the chargeable and dischargeable state, the micro-controller 30 executes the recharging protection program, and the micro-controller 30 sends parameters and instructions for recharging protection to the analog front-end circuit 20. The recharging protection program includes the step S2012 and the step S2013.

Step S2012: check whether the voltage of the battery cell module 10 is higher than the voltage protection threshold by the analog front-end circuit 20.

Step S2013: check whether the recharging current exists by the analog front-end circuit 20, when the voltage of the battery cell module 10 is higher than the voltage protection threshold and the recharging current exists, proceed with a next step S202 of sending the shut command to the analog front-end circuit 20 by the micro-controller 30, sending the stop signal to the charging field-effect transistor 41 and the discharging field-effect transistor 42 of the battery management system 100 to stop charging the battery cell module 10 by the analog front-end circuit 20, the micro-controller 30 receiving the recharging over-voltage protection status from the analog front-end circuit 20, writing the recharging over-voltage protection status to the log of the electrically erasable read-only memory 50 by the micro-controller 30, then checking whether the recharging current exists until the recharging current is nonexistent by the analog front-end circuit 20. When the voltage of the battery cell module 10 is higher than the voltage protection threshold and the recharging current is nonexistent, proceed with a subsequent step S203 of keeping the battery cell module 10 in the chargeable and dischargeable state by the battery management system 100, the battery cell module 10 is located in the safe status, and then return to the recharging protection step of charging and discharging the battery cell module 10 when the electric vehicle is in the driving status, and when the voltage of the battery cell module 10 is lower than the voltage protection threshold, proceed with the subsequent step S203 of keeping the battery cell module 10 in the chargeable and discharge-able state by the battery management system 100, the battery cell module 10 is located in the safe status, and then return to the recharging protection step of charging and discharging the battery cell module 10 when the electric vehicle is in the driving status.

Step S202: the micro-controller 30 sends the shut command to the analog front-end circuit 20 when the voltage of the battery cell module 10 is higher than the voltage protection threshold and the recharging current exists, the analog front-end circuit 20 sends the stop signal to the charging field-effect transistor (C-FET) 41 and the discharging field-effect transistor (D-FET) 42 of the battery management system 100 to stop charging the battery cell module 10, the micro-controller 30 receives the recharging over-voltage protection status from the analog front-end circuit 20, the micro-controller 30 writes the recharging over-voltage protection status to the log of the electrically erasable read-only memory 50, then the analog front-end circuit 20 checks whether the recharging current exists until the recharging current is nonexistent.

Step S203: the battery management system 100 keeps the battery cell module 10 being in the chargeable and dis-chargeable state when the voltage of the battery cell module 10 is lower than the voltage protection threshold, or the voltage of the battery cell module 10 is higher than the voltage protection threshold and the recharging current is nonexistent, the battery cell module 10 is located in the safe status, and then return to the recharging protection step S201 of charging and discharging the battery cell module 10 when the electric vehicle is in the driving status.

As described above, the battery management system 100 checks whether the charging cable is connected, if the charging cable is without being connected to the battery management system 100, unwrite the over-voltage protection parameters or the over-voltage protection instructions to the analog front-end circuit 20, the analog front-end circuit 20 continues measuring the battery information, so when the voltage of the battery cell module 10 exceeds the voltage protection threshold from the beginning, and the battery cell module 10 is still able to discharge normally and directly.

What is claimed is:

1. A battery management system, comprising:
    a battery cell module;
    a switching circuit connected in parallel with the battery cell module, the switching circuit including a charging field-effect transistor and a discharging field-effect transistor;
    an analog front-end circuit configured to monitor battery information of the battery cell module, the battery information including a voltage of the battery cell module, a current of the battery cell module and a temperature of the battery cell module, the analog front-end circuit being connected with the switching circuit;
    an electrically erasable read-only memory which is reproducible; and
    a micro-controller storing a starting program, when the starting program is executed by the micro-controller, the starting program checking whether a charging cable is connected to the battery management system via the analog front-end circuit, if the charging cable is connected to the battery management system, continuing to execute an over-voltage protection program, if the charging cable is unconnected with the battery management system, the battery information and instructions being unwritten to the analog front-end circuit to just make the analog front-end circuit continue measuring the battery information,
    wherein when the over-voltage protection program is executed by the micro-controller, the micro-controller sends over-voltage protection parameters and over-voltage protection instructions to the analog front-end circuit, check the voltage of the battery cell module by the analog front-end circuit, and check whether the charging cable is connected to the battery management system via the analog front-end circuit, when the voltage of the battery cell module is higher than a voltage protection threshold, and the charging cable is connected to the battery management system, the analog front-end circuit sends a stop signal to the charging field-effect transistor and the discharging filed-effect transistor to stop charging the battery cell module, the micro-controller writes an over-voltage protection status to a log of the electrically erasable read-only memory, the battery management system keeps displaying an over-voltage protection lamp signal, when the voltage of the battery cell module is higher than the voltage protection threshold, and the charging cable is unconnected with the battery management system, the micro-controller writes the over-voltage protection status to the log of the electrically erasable read-only memory, and the micro-controller directly shuts down the battery management system to stop all charging and discharging processes of the battery cell module, when the voltage of the battery cell module is lower than the voltage protection threshold, the battery management system keeps the battery cell module in a chargeable and dischargeable state.

2. The battery management system as claimed in claim 1, wherein the micro-controller further stores a recharging protection program, when the recharging protection program is executed by the micro-controller, the micro-controller checks the voltage of the battery cell module via the analog front-end circuit, the micro-controller writes the over-voltage protection parameters and the over-voltage protection instructions to the analog front-end circuit, when the voltage of the battery cell module is higher than the voltage protection threshold and the battery cell module has a recharging current, the micro-controller sends a shut command to the analog front-end circuit, the analog front-end circuit sends the stop signal to the charging field-effect transistor and the discharging filed-effect transistor to stop charging the battery cell module, the micro-controller receives a recharging over-voltage protection status from the analog front-end circuit, the micro-controller writes the recharging over-voltage protection status to the log of the electrically erasable read-only memory.

3. An over-voltage protection method of a battery management system for avoiding a battery cell module from overcharging, the battery management system including an electrically erasable read-only memory, a charging field-effect transistor electrically connected to the battery cell module for controlling a charging current, an analog front-end circuit electrically connected to the battery cell module and the charging field-effect transistor for monitoring battery information and controlling the charging field-effect transistor, and a micro-controller electrically connected to the analog front-end circuit, the micro-controller storing over-voltage protection parameters and over-voltage protection instructions, the over-voltage protection method comprising steps of:

starting the battery management system;

executing a starting program by the micro-controller to check whether a charging cable is connected to the battery management system via the analog front-end circuit, if the charging cable is connected to the battery management system, executing a step of executing an over-voltage protection program by the micro-controller, if the charging cable is unconnected with the battery management system, executing a step of unwriting the over-voltage protection parameters and the over-voltage protection instructions to the analog front-end circuit via the micro-controller;

unwriting the over-voltage protection parameters and the over-voltage protection instructions to the analog front-end circuit via the micro-controller, keeping the analog front-end circuit measuring the battery information by the micro-controller, when the voltage of the battery cell module exceeds the voltage protection threshold from a beginning, the battery management system being prevented from cutting off the charging field-effect transistor, and the battery cell module being still able to discharge normally; and executing the over-voltage protection program by the micro-controller, sending the over-voltage protection parameters and the over-voltage protection instructions to the analog front-end circuit by the micro-controller, checking whether the voltage of the battery cell module is higher than the voltage protection threshold by the analog front-end circuit, checking whether the charging cable is connected to the battery management system by the analog front-end circuit, wherein when the voltage of the battery cell module is higher than the voltage protection threshold, and the charging cable is connected to the battery management system to charge the battery cell module, proceed with a step of sending a stop signal to the charging field-effect transistor by the analog front-end circuit, so the battery cell module is stopped being charged to prevent an over-charging of the battery cell module from damaging the battery cell module, the micro-controller writes an over-voltage protection status to a log of the electrically erasable read-only memory, and the battery management system keeps displaying an over-voltage protection lamp signal, wherein when the voltage of the battery cell module is higher than the voltage protection threshold, and the charging cable is unconnected with the battery management system, execute steps of writing the over-voltage protection status to the log of the electrically erasable read-only memory by the micro-controller and shutting down the battery management system directly to stop further charging or discharging the battery cell module, and wherein when the voltage of the battery cell module is lower than the voltage protection threshold, execute a step of keeping the battery cell module being in a chargeable and dischargeable state and being without checking a connection of the charging cable, the battery cell module is located in a safe status.

4. The over-voltage protection method as claimed in claim 3, further comprising the steps of:

charging and discharging the battery cell module when an electric vehicle using the battery management system is in a driving status, the battery cell module being in the chargeable and dischargeable state, the micro-controller executing a recharging protection program, the recharging protection program including steps of checking whether the voltage of the battery cell module is higher than the voltage protection threshold by the analog front-end circuit, and checking whether a recharging current exists by the analog front-end circuit, wherein when the voltage of the battery cell module is higher than the voltage protection threshold and the recharging current exists, proceed with a step of sending a shut command to the analog front-end circuit by the micro-controller, sending the stop signal to the charging field-effect transistor and a discharging field-effect transistor of the battery management system to stop charging the battery cell module by the analog front-end circuit, the micro-controller receiving a recharging over-voltage protection status from the analog front-end circuit, writing the recharging over-voltage protection status to the log of the electrically erasable read-only memory by the micro-controller, then checking whether the recharging current exists until the recharging current is nonexistent by the analog front-end circuit, wherein when the voltage of the battery cell module is higher than the voltage protection threshold and the recharging current is nonexistent, proceed with a step of keeping the battery cell module in the chargeable and dischargeable state by the battery management system, the battery cell module is located in the safe status, and then return to the recharging protection step of charging and discharging the battery cell module when the electric vehicle is in the driving status, and wherein when the voltage of the battery cell module is lower than the voltage protection threshold, proceed with the step of keeping the battery cell module in the chargeable and dischargeable state by the battery management system, the battery cell module is located in the safe status, and then return to the recharging protection step of charging and discharging the battery cell module when the electric vehicle is in the driving status.

5. An over-voltage protection method of a battery management system for avoiding a battery cell module from overcharging, the battery management system including a charging field-effect transistor electrically connected to the battery cell module for controlling a charging current, a discharging field-effect transistor, an analog front-end circuit electrically connected to the battery cell module and the charging field-effect transistor for monitoring battery information and controlling the charging field-effect transistor, and a micro-controller electrically connected to the analog front-end circuit, the micro-controller storing over-voltage protection parameters and over-voltage protection instructions, the over-voltage protection method comprising steps of:

checking whether a charging cable is connected to the battery management system via the analog front-end circuit, if the charging cable is connected to the battery management system, executing a step of executing an over-voltage protection program, if the charging cable is unconnected with the battery management system, executing a step of unwriting the over-voltage protection parameters and the over-voltage protection instructions to the analog front-end circuit;

unwriting the over-voltage protection parameters and the over-voltage protection instructions to the analog front-end circuit via the micro-controller, keeping the analog front-end circuit measuring the battery information by the micro-controller, when the voltage of the battery cell module exceeds a voltage protection threshold from a beginning, the battery management system being prevented from cutting off the charging field-effect transistor, and the battery cell module being still able to discharge normally;

executing the over-voltage protection program by the micro-controller, sending the over-voltage protection parameters and the over-voltage protection instructions to the analog front-end circuit by the micro-controller, the analog front-end circuit checking whether the voltage of the battery cell module is higher than the voltage protection threshold;

checking whether the charging cable is connected to the battery management system by the analog front-end circuit, when the voltage of the battery cell module is higher than the voltage protection threshold, and the charging cable is connected to the battery management system, proceeding with a step of sending the stop signal to the charging field-effect transistor, when the voltage of the battery cell module is higher than the voltage protection threshold, and the charging cable is unconnected with the battery management system, executing a step of shutting down the battery management system, when the voltage of the battery cell module is lower than the voltage protection threshold, executing a step of keeping the battery cell module being in a chargeable and dischargeable state, procedures of executing the over-voltage protection program including charging and discharging the battery cell module when an electric vehicle using the battery management system is in a driving status, checking whether the voltage of the battery cell module is higher than the voltage protection threshold by the analog front-end circuit, checking whether a recharging current exists by the analog front-end circuit, when the voltage of the battery cell module is higher than the voltage protection threshold and the recharging current exists, proceeding with a next step of stopping charging the battery cell module, when the voltage of the battery cell module is higher than the voltage protection threshold and the recharging current is nonexistent, then proceeding with a subsequent step of keeping the battery cell module in the chargeable and dischargeable state, and when the voltage of the battery cell module is lower than the voltage protection threshold, then proceeding with the subsequent step of keeping the battery cell module in the chargeable and dischargeable state, sending a shut command to the analog front-end circuit when the voltage of the battery cell module is higher than the voltage protection threshold and the recharging current exists, the analog front-end circuit sending the stop signal to the charging field-effect transistor and the discharging field-effect transistor to stop charging the battery cell module, then the analog front-end circuit checking whether the recharging current exists until the recharging current is nonexistent, and keeping the battery cell module being in the chargeable and dischargeable state when the voltage of the battery cell module is lower than the voltage protection threshold, or the voltage of the battery cell module is higher than the voltage protection threshold and the recharging current is nonexistent, the battery cell module being located in a safe status, and then returning to the recharging protection step of charging and discharging the battery cell module when the electric vehicle is in the driving status;

sending a stop signal to the charging field-effect transistor by the analog front-end circuit to stop charging the battery cell module when the voltage of the battery cell module is higher than the voltage protection threshold and the charging cable is connected to the battery management system, then an over-voltage protection loop being generated, the analog front-end circuit checking whether the charging cable is connected to the battery management system until the charging cable is unconnected;

writing an over-voltage protection status to a log of an electrically erasable read-only memory by the micro-controller when the battery cell module is charged to make the voltage of the battery cell module be higher than the voltage protection threshold and the charging cable is moved away, the micro-controller shutting down the battery management system directly to stop further charging or discharging the battery cell module; and keeping the battery cell module being in the chargeable and dischargeable state without checking a connection of the charging cable when the voltage of the battery cell module is lower than the voltage protection threshold, the battery cell module being located in a safe status.

* * * * *